(12) United States Patent
Mahley, III (10) Patent No.: US 9,186,629 B2
(45) Date of Patent: Nov. 17, 2015

(54) SINGLE END, SHELL-SIDE FEED, HOLLOW FIBER MEMBRANE SEPARATION MODULE

(71) Applicant: Cameron Solutions, Inc., Houston, TX (US)

(72) Inventor: George E. Mahley, III, Berkeley, CA (US)

(73) Assignee: Cameron Solutions, Inc., Houston, TX (US)

(*) Notice: Subject to any disclaimer, the term of this patent is extended or adjusted under 35 U.S.C. 154(b) by 10 days.

(21) Appl. No.: 13/975,771

(22) Filed: Aug. 26, 2013

(65) Prior Publication Data

US 2015/0053085 A1    Feb. 26, 2015

(51) Int. Cl.
*B01D 53/22* (2006.01)
*B01D 63/02* (2006.01)

(52) U.S. Cl.
CPC .............. *B01D 63/024* (2013.01); *B01D 53/22* (2013.01); *B01D 2053/224* (2013.01); *B01D 2257/504* (2013.01); *B01D 2313/08* (2013.01); *B01D 2313/105* (2013.01); *B01D 2313/23* (2013.01); *B01D 2315/10* (2013.01)

(58) Field of Classification Search
CPC ...... B01D 53/22; B01D 63/02; B01D 63/024; B01D 2053/224; B01D 2313/23; B01D 2313/08; B01D 2313/105; B01D 2315/10; B01D 2257/504
USPC ..................................... 95/43, 45; 96/7, 8, 10
See application file for complete search history.

(56) References Cited

U.S. PATENT DOCUMENTS

| | | | | |
|---|---|---|---|---|
| 2,734,592 A * | 2/1956 | Jones | .................................. | 96/8 |
| 3,498,909 A * | 3/1970 | Littman | ........................ | 210/652 |
| 3,616,928 A * | 11/1971 | Rosenblatt | ................. | 210/321.8 |
| 3,702,658 A * | 11/1972 | McNamara | ................ | 210/321.8 |
| 4,002,567 A * | 1/1977 | Konno et al. | ............ | 210/333.01 |
| 4,061,574 A * | 12/1977 | Clark | ......................... | 210/321.9 |
| 4,220,535 A * | 9/1980 | Leonard | ................... | 210/321.89 |
| 4,380,460 A | 4/1983 | Otstot et al. | | |
| 4,556,180 A * | 12/1985 | Manatt | ...................... | 244/135 R |
| 4,623,460 A * | 11/1986 | Kuzumoto et al. | ...... | 210/321.87 |
| 4,687,578 A | 8/1987 | Stookey | | |
| 4,690,760 A * | 9/1987 | Smoot et al. | ............ | 210/321.89 |
| 4,865,736 A * | 9/1989 | Coplan | .................... | 210/321.79 |
| 4,929,259 A * | 5/1990 | Caskey et al. | ........... | 210/321.89 |
| 5,059,374 A * | 10/1991 | Krueger et al. | .............. | 264/156 |
| 5,133,858 A * | 7/1992 | Walz et al. | .................... | 210/136 |
| 5,207,906 A | 5/1993 | Auvil et al. | | |
| 5,897,729 A | 4/1999 | Bikson et al. | | |
| 6,210,464 B1 * | 4/2001 | Nakanishi et al. | ................ | 95/52 |
| 7,651,551 B2 * | 1/2010 | Wright et al. | ....................... | 96/4 |

(Continued)

FOREIGN PATENT DOCUMENTS

| | | |
|---|---|---|
| EP | 1374974 | 1/2004 |
| WO | 2009006850 | 1/2009 |

*Primary Examiner* — Jason M Greene
*Assistant Examiner* — Anthony Shumate
(74) *Attorney, Agent, or Firm* — Gable Gotwals (57) ABSTRACT

A shell-side feed, hollow fiber, fluid separation module arranged for counter-flow includes a hollow fiber membrane bundle with each individual hollow fiber membrane in the bundle having an open fiber end and a sealed fiber end. The open fiber ends are encapsulated in a tubesheet located toward the permeate fluid outlet end of the module. The sealed fiber ends are tubesheet-free, uniformly spaced, and located toward the non-permeate fluid outlet end of the module.

6 Claims, 9 Drawing Sheets

(56) References Cited

U.S. PATENT DOCUMENTS

| | | | |
|---|---|---|---|
| 8,066,801 B2* | 11/2011 | Nichols | 95/52 |
| 8,147,594 B2* | 4/2012 | Wright et al. | 96/4 |
| 2002/0162455 A1 | 11/2002 | Bikson et al. | |
| 2002/0189445 A1* | 12/2002 | Miller et al. | 95/51 |
| 2007/0107596 A1 | 5/2007 | Wynn et al. | |
| 2010/0212502 A1* | 8/2010 | Moore et al. | 96/8 |
| 2013/0253250 A1* | 9/2013 | Gulyansky et al. | 585/818 |
| 2014/0263061 A1* | 9/2014 | Taylor et al. | 210/640 |

\* cited by examiner

SINGLE END, SHELL-SIDE FEED, HOLLOW FIBER MEMBRANE SEPARATION MODULE

BACKGROUND OF THE INVENTION

The present invention relates to shell-side feed, gas separation devices or modules which use hollow fiber membranes that exhibit selective permeability to fluids such as gases. The invention may also be used in vaporization or liquid separation devices or modules.

Prior art shell-side feed, hollow fiber, gas separation modules have each end of the hollow fibers encased or encapsulated in a tubesheet, with one tubesheet located toward a feed gas inlet side of the device and the other tubesheet located toward a permeate gas flow outlet. If a counter-current flow arrangement is desired—i.e., between the gas flowing on the permeate side of the hollow fibers and that flowing on the non-permeate side—then one tubesheet has the permeate gas flow to it blocked, thereby blocking the hollow fiber bores on the non-permeate fluid outlet end. This blocked tubesheet then becomes an obstruction to the feed gas flow.

Usually the fiber bore blocking is done by encasing the entire end of the fiber bundle in a tubesheet where the fibers do not extend all the way through. If the fiber ends were open while this non-permeate side tubesheet is formed, then the fibers will be plugged with the tubesheet potting material as well as being collectively encased.

The hollow fiber bores are only required to be open on the non-permeate fluid outlet end if a sweep gas will be introduced. If the tubesheet is finished to have both ends of the fibers opened then the tubesheet located toward the non-permeate fluid outlet end will have to be blocked by another means such as a plate or painting the tubesheet face with a material that plugs the fibers.

Some designs attempt to mitigate the obstruction problem by using tubes to create discrete flow paths through the blocked tubesheet (see e.g., U.S. Pat. No. 5,207,906 to Auvil et al.). Other designs include fiber loops which begin and end in the same tubesheet, thereby eliminating the blocked tubesheet.

A need exists for a shell-side feed, hollow fiber, fluid separation module that can efficiently handle a counter-current flow arrangement without obstructing feed fluid flow while preventing feed fluid from leaking into the bore of the hollow fiber membranes.

SUMMARY OF THE INVENTION

A shell-side feed, hollow fiber, fluid separation device made according to this invention has one end of the hollow fibers encased collectively in a tubesheet and the other end of the fibers sealed individually, in small groups, or in patterns. These patterns of joined, sealed fibers, such as one or more concentric circles about a center perforated pipe, are designed to counter any non-ideal flow patterns caused by the feed fluid being introduced to the inside diameter of the hollow fiber bundle. The tubesheet-encapsulated hollow fibers provide collection and removal of the low pressure, bore-side permeate fluid. The sealed hollow fibers provide enhanced flow distribution of the higher pressure fluid mixture being fed into the space outside of the fibers.

Objects of this invention are to provide a shell-side feed, hollow fiber, fluid separation module which (1) does not obstruct the feed gas flow under a counter-current flow arrangement; (2) improves separation performance in applications in which pressure in the fiber bore is not a significant factor in determining separation performance as compared to cross-flow modules with both tubesheets open for permeate flow; (3) can be used in low $CO_2$ and high pressure $CO_2$ removal applications; (4) does not rely upon each end of the hollow fibers being encased or encapsulated in a tubesheet; (5) enhances flow distribution of the higher pressure fluid mixture being fed into the space outside of the fibers as compared to existing art counter flow modules; and (6) reduces the manufacturing and operational cost of the overall device.

| Element numbers and elements used in the drawings: | |
|---|---|
| 10 | Single end separation module and housing assembly |
| 11 | Housing/pressure casing |
| 13 | Feed fluid inlet |
| 15 | Non-permeate fluid outlet |
| 17 | Permeate fluid outlet |
| 19 | Tubesheet |
| 20 | Cartridge |
| 21 | Perforated pipe (at one end) |
| 30 | Hollow fiber membrane bundle |
| 31 | Individual hollow fiber membrane |
| 33 | Outer wall of 31 |
| 35 | Bore of 31 |
| 37 | Removable closure and permeate fluid outlet end of 11 |
| 39 | Open fiber end of 31 |
| 41 | Non-permeate fluid outlet end of 11 |
| 43 | Sealed fiber end of 31 |
| 45 | Baffle surrounding 30 |

DETAILED DESCRIPTION OF THE PREFERRED EMBODIMENTS

To date, there have not been any shell-side feed, hollow fiber membrane, fluid separation module designs which seal individual hollow fibers or groups of hollow fibers at one end without the use of a tubesheet for the purpose of allowing improved flow distribution through the hollow fiber bundle.

Figure 1:
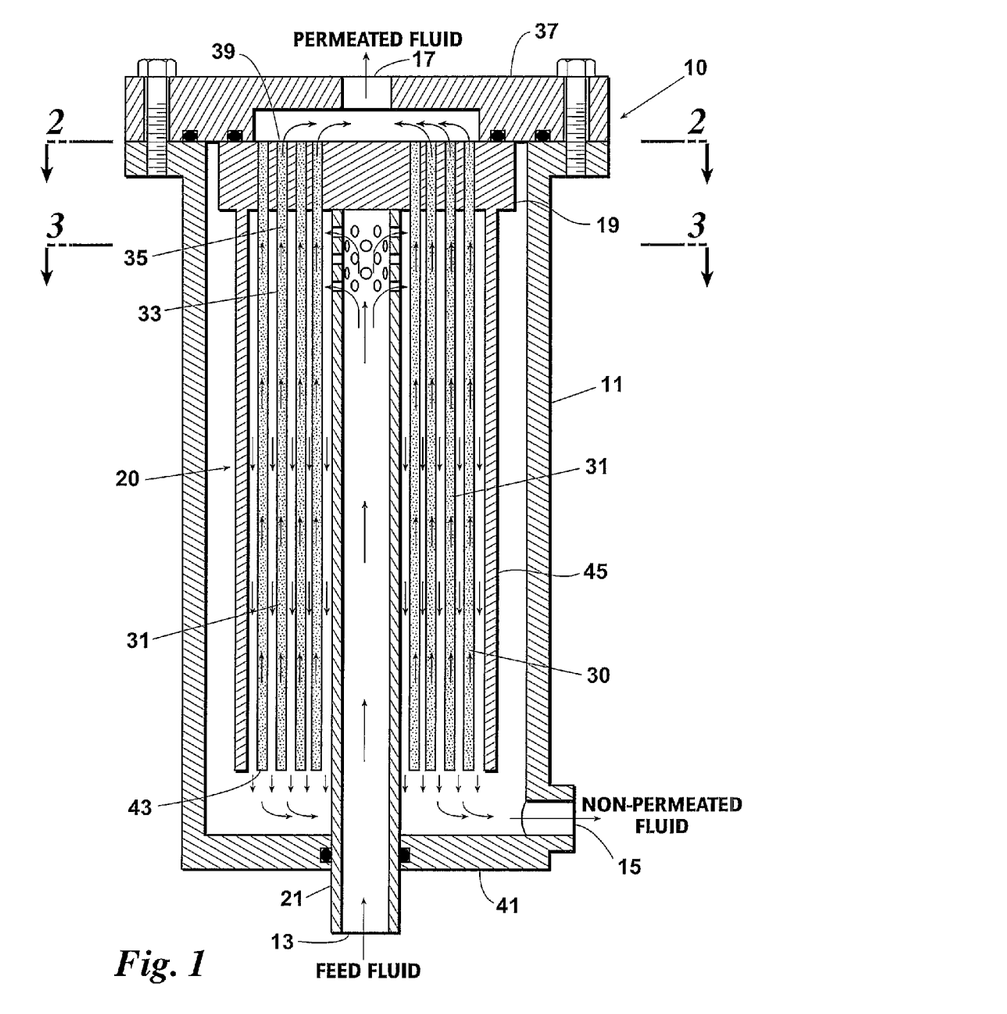
FIG. 1 is a cross-section view of a preferred embodiment of a shell-side feed, hollow fiber, fluid separation device or module made according to this invention. The device is arranged for counter-flow, with a permeate flow end of each hollow fiber encased in a tubesheet and a non-permeate flow end of each hollow fiber sealed (tubesheet-free).
Figure 2:
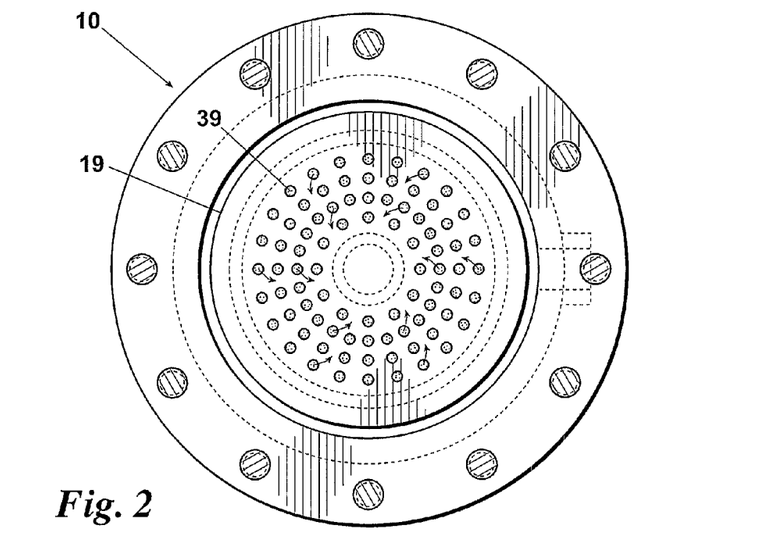
FIG. 2 is a view of the module of FIG. 1 taken along section line 2-2.
Figure 3:
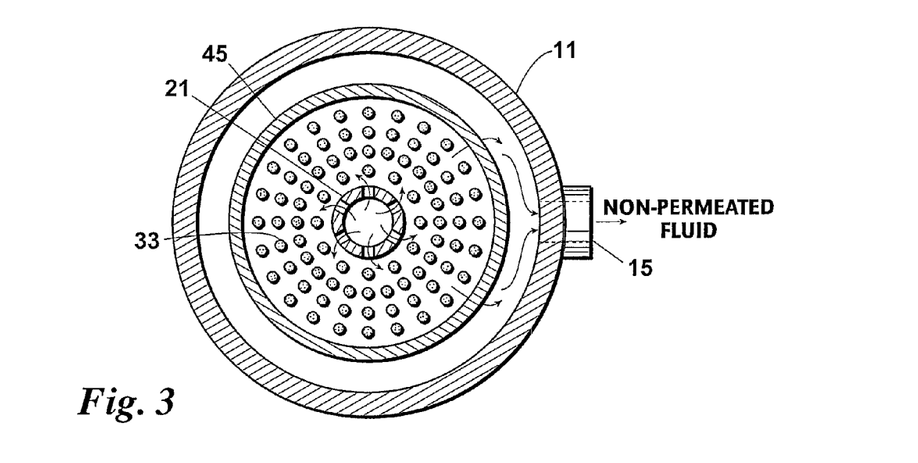
FIG. 3 is a view of the module of FIG. 1 taken along section line 3-3.

Referring to FIGS. 1-3, a preferred embodiment of a single end, shell-side feed, hollow fiber, fluid separation device or module 10 made according to this invention includes a cylindrical-shaped, sealed housing or pressure casing 11 having a feed fluid inlet 13, a retentate or non-permeate fluid outlet 15, and a waste or permeate fluid outlet 17. The pressure casing 11 houses a cylindrical-shaped cartridge 20 that includes a tubular-shaped inner core in the form of a perforated pipe 21 surrounded by a hollow fiber membrane bundle 30. The pressure casing 11 and cartridge 20 are arranged coaxial. The perforated pipe 21 is perforated at the end opposite the feed end.

The hollow fiber membrane bundle 30 includes a plurality of individual hollow fiber membranes 31 that are wrapped around the pipe 21. Alternatively, the fibers 31 may be arranged in bundles which are then wrapped about the pipe 21. The bundle 30 is surrounded by a baffle 45 which prevents fluid from crossing or passing to the outside of the bundle 30.

As discussed in Peters et al., "Membrane filter element with multiple fiber types," WO2010/096455 A1, hereby incorporated by reference, the bundle 30 may be fabricated from a single type of hollow fiber or from two or more different types of hollow fibers. For example, the fibers 31 located in a first circumferential zone of the bundle 30 and those located in a second circumferential zone can be different and, therefore, have different performance characteristics.

Regardless of whether the individual hollow fibers 31 are wrapped about the pipe 21 or bundled and then wrapped, the fibers 31 are arranged so that the portion of fluid flow (e.g., acid gas and other undesirable components) which permeates the outer wall 33 of the fiber 31 and enters the bore 35 of the fiber 31, exits through the permeate fluid outlet 17. The non-permeate fluid flow, which flows outside of the fibers 31, exits through the non-permeate fluid outlet 15.

Unlike the prior art, which has open ends on each end of the hollow fiber membranes, and which encapsulates the open ends of the bundle in a tubesheet—or prior art counter modules which have one end plugged or blocked by the tubesheet or looped fibers within the tubesheet—a module 10 made according to this invention has an open fiber end 39 encapsulated in a tubesheet 19 and a sealed fiber end 43 which is tubesheet-free. The open fiber ends 39 pass through tubesheet 19 located toward the permeate fluid outlet end 37. The sealed fiber ends 43 are located toward the non-permeate fluid outlet end 41.

The sealed fiber end 43 may be sealed by means such as, but not limited to, heat sealing, ultrasonic sealing, or plugging with paint, epoxy, urethane, hot melt glue, or other suitable materials. In a preferred embodiment of the sealing method, a hollow fiber membrane fabric is created with the fiber open ends on the edges of the fabric. The fibers are arranged in 90 fiber tows with some space between each tow. The tows form the bundle of many thousands of fibers (e.g., about 900,000 fibers). The fiber ends are heat sealed while the fabric is wound around pipe 21. Alternatively the edge of the fabric could be painted or dipped with epoxy or hot melt prior to the fabric being wrapped about pipe 21.

Regardless of the sealing method, the 90 fiber tows end up sealed together in predetermined manner, thereby forming groups of fibers as opposed to individual fibers. These groups provide a feed flow distribution-enhancing pattern.

Test Results

A 12-inch diameter by 41-inch long (30.48 cm×104.14 cm) single end ("SE") prototype membrane module made according to this invention was air tested at varying flow rates. A standard 12-inch (30.48 cm×104.14 cm) membrane module was tested at the same conditions. The performance of these modules was compared against each other and against computer models that simulate ideal counter-flow performance (SE) and ideal cross-flow performance (standard).

Figure 4:
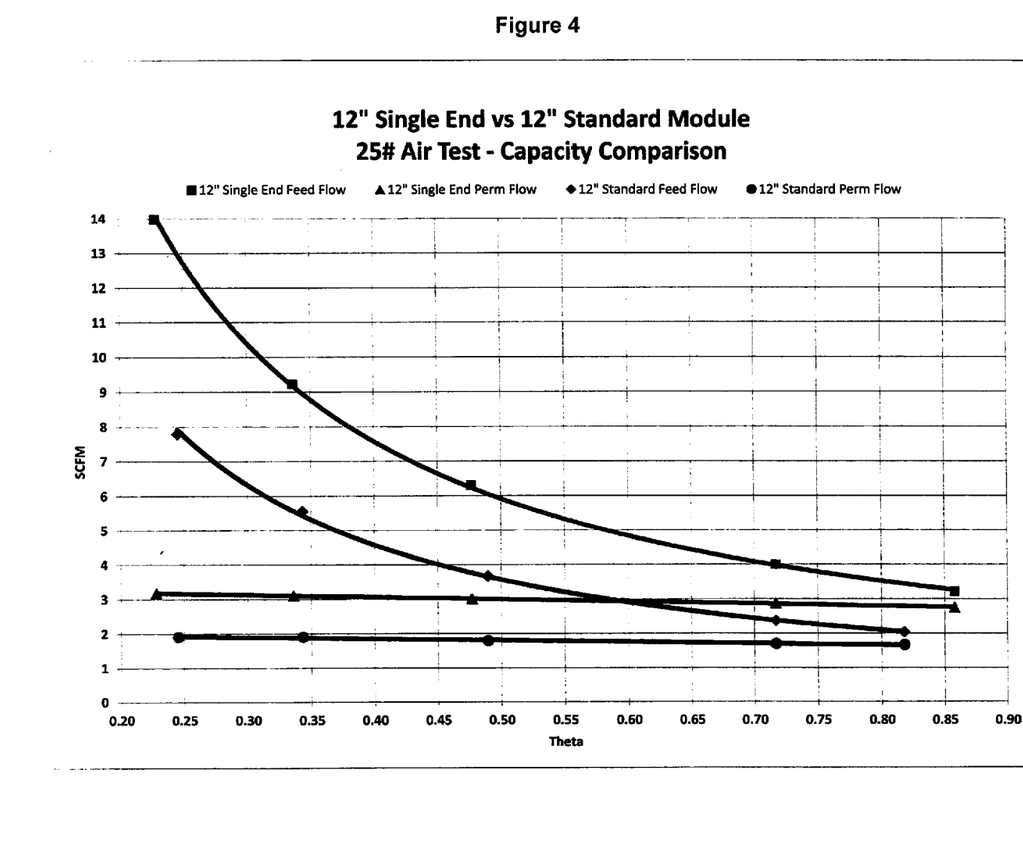
FIG. 4 is a chart comparing the capacity of a separation module made according to the invention ("single end" or "SE") with an equivalent sized prior art device ("the standard module," a cross-flow module with both tubesheets open for permeate flow).
Figure 5:
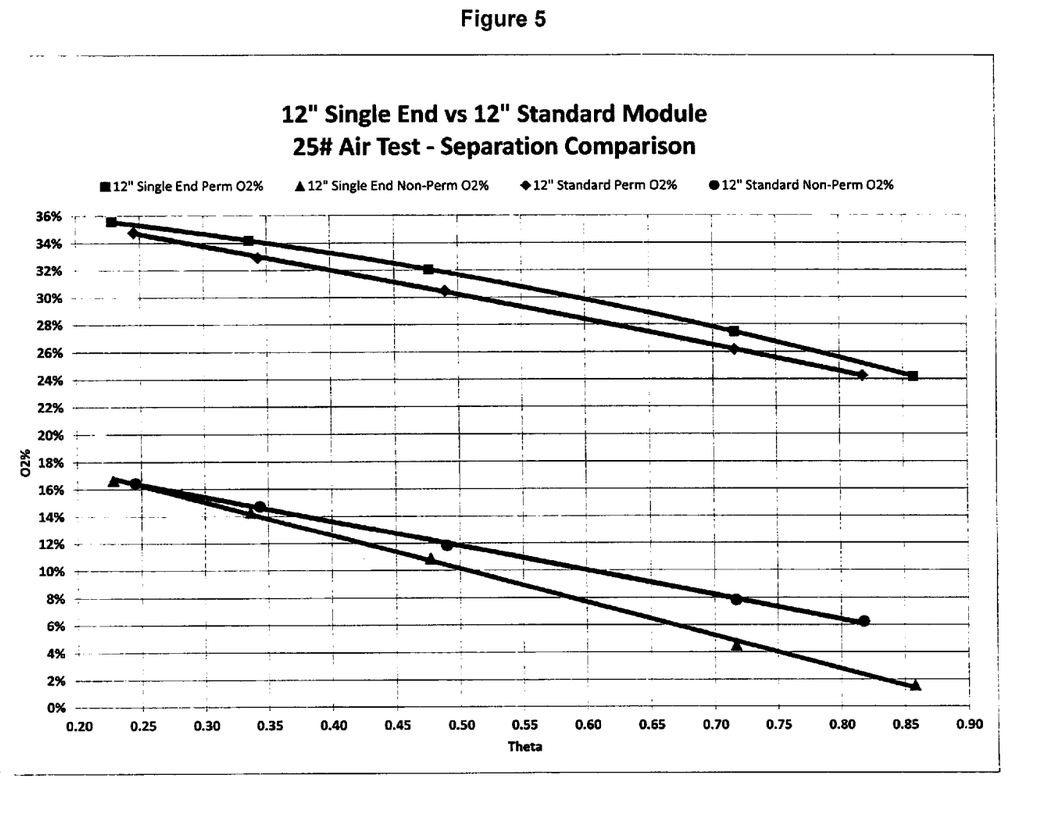
FIG. 5 is a chart comparing the separation performance of the modules of FIG. 4.

Both the SE and standard modules were tested at a range of flow conditions with 25 psig air. The results of this testing, plotted by flow theta, defined as the ratio of permeate flow to feed flow, are shown in FIGS. 4 and 5. In comparing the permeate flow rates, the SE module has about 60% greater capacity than that of the standard module (see FIG. 4). This is an unexpected and surprising result because there is only about 15% more surface area in the SE module relative to the standard module in this example. The SE module has higher permeate $O_2$% and lower non-permeate $O_2$% across the range of flows (see FIG. 5). The margin of improved separation performance for the SE module increases as the feed flow is reduced. The SE module is capable of achieving significantly lower $O_2$% in the non-permeate flow (1.5%) than the standard module (6.2%).

Figure 6:
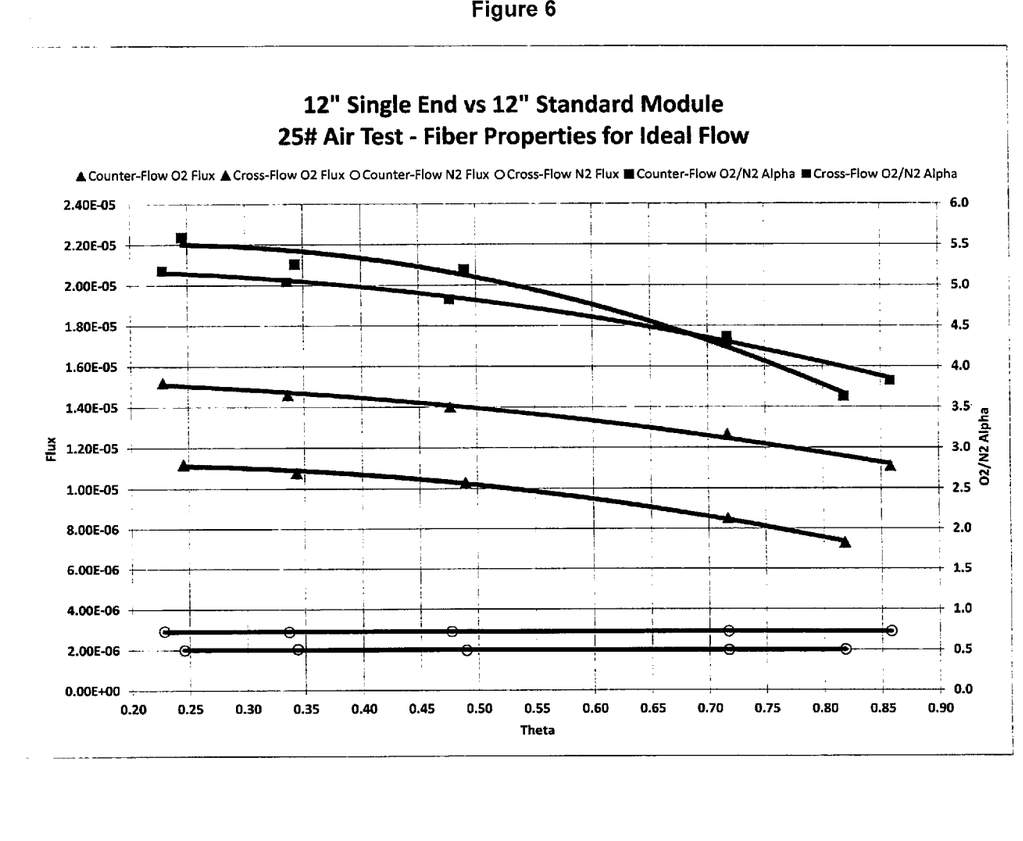
FIG. 6 is a chart comparing the results of the air test of FIGS. 4 and 5 to the ideal (computer model) counter- and cross-flow.

The results of the above air testing were then compared to the ideal computer simulation models for each module, namely, counter-flow for the SE module and cross-flow for the standard module (see FIG. 6). For each theta, an $O_2$ flux and an $O_2/N_2$ alpha were determined in order for the ideal computer models to match the observed actual module performance.

For both module types, as theta increased, the determined $O_2$ flux and $O_2/N_2$ alpha decreased. This suggested that deviation from ideal performance increases as theta increases.

The $N_2$ flux determined for ideal performance remained constant across the entire range of flows. At 0.35 theta, the effective $O_2$ flux and $N_2$ fluxes are 35% and 45% higher, respectively for the SE module than the standard module. Those higher fluxes for the SE module were unexpected and surprising, and may be the result of the counter-flow pattern forcing the feed gas to have better and longer contact with the membrane fibers. The higher fluxes, combined with the 15% additional active area, may explain the observed 60% greater capacity of the SE module.

The method used to predict how an ideal module should perform was to (1) use the $O_2$ flux and $O_2/N_2$ alpha values that were calculated at the low theta condition—15.2 $O_2$ flux and 5.2 $O_2/N_2$ alpha for the SE module and 11.2 $O_2$ flux and 5.6 $O_2/N_2$ alpha for the standard—and (2) hold those values constant while predicting the separation performance at the progressively higher theta conditions: The results of these performance predictions are shown with the actual module performance in FIGS. 7-10.

Figure 7:
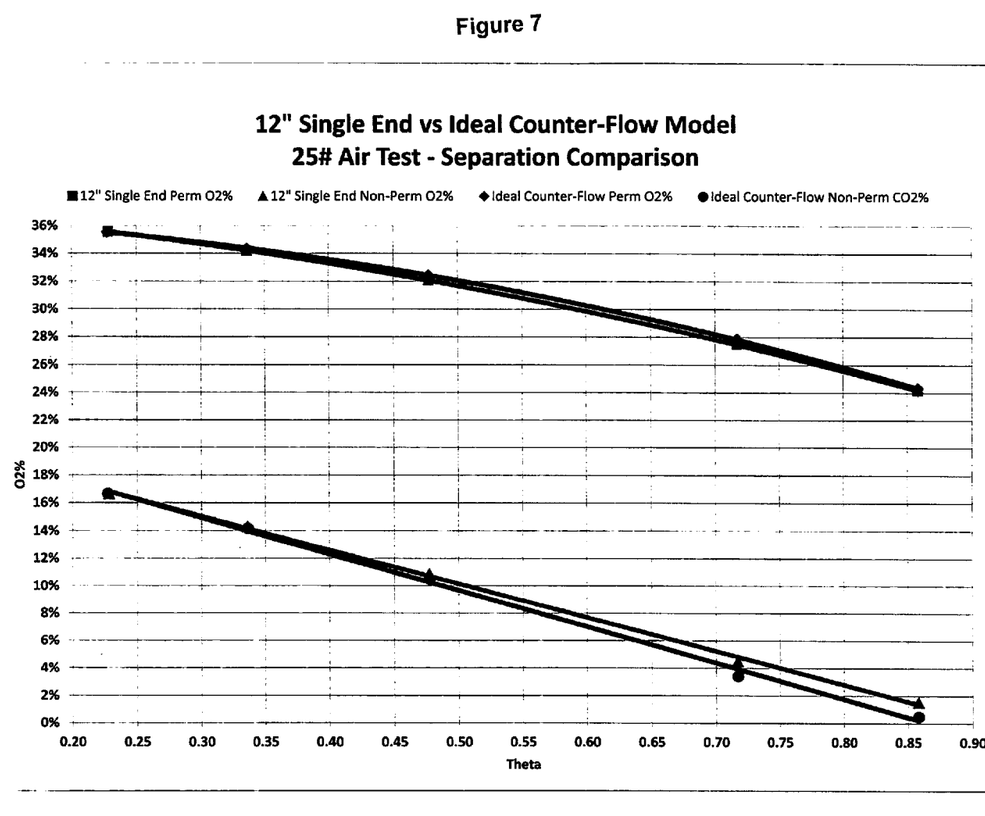
FIG. 7 is a chart comparing the single end module's separation performance with the ideal counter-flow.
Figure 8:
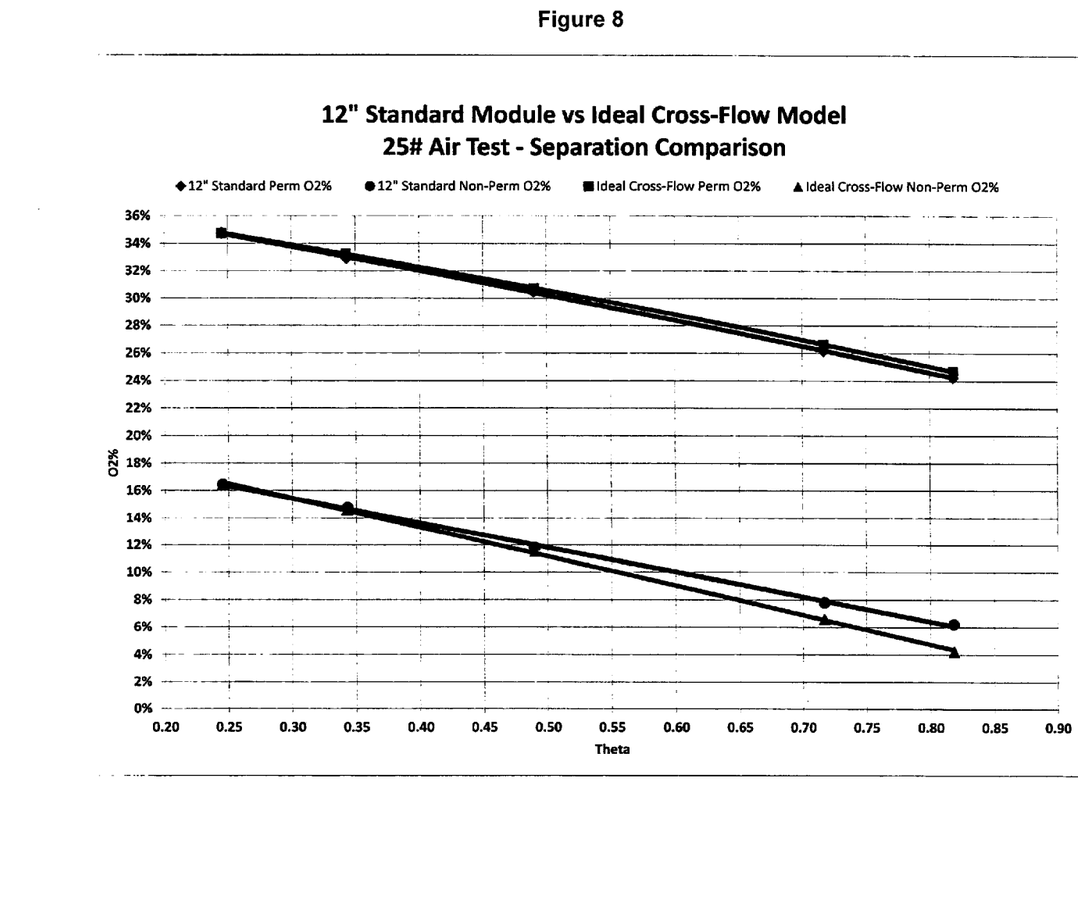
FIG. 8 is a chart comparing the standard module's separation performance with the ideal cross-flow.

FIGS. 7 and 8 show that actual performance of both modules deviate from predicted performance as theta is increased. The difference is mostly seen in the non-permeate flow $O_2$%. The permeate flow $O_2$% for both modules tracks fairly close to predicted.

SE module is capable of achieving a lower $O_2$% in the non-permeate stream than is the standard module (see FIG. 5). The ideal computer models predict that result (see FIGS. 7 and 8).

The standard module air test performance showed greater deviation from an ideal cross-flow computer model, as feed flow was reduced, than did the SE module from the ideal counter-flow model. The ideal counter-flow model predicted that the SE module would achieve lower non-permeate $O_2$% (0.5%) for air at 25 psig feed pressure than the ideal cross-flow model predicted (4.2%) for the standard module. As mentioned above, the SE module achieved 1.5% non-permeate $O_2$ compared to 6.2% for the standard module.

Figure 9:
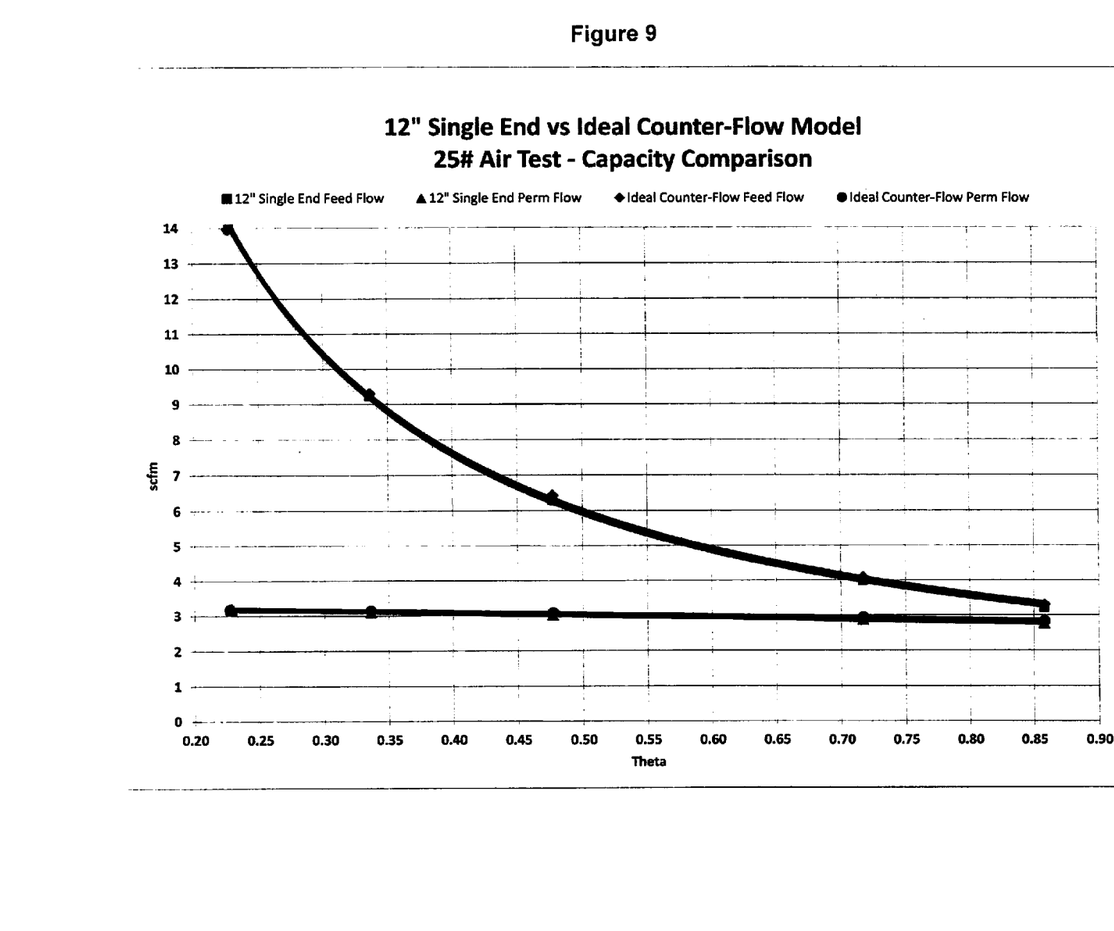
FIG. 9 is a chart comparing the single end module's capacity with the ideal counter-flow.
Figure 10:
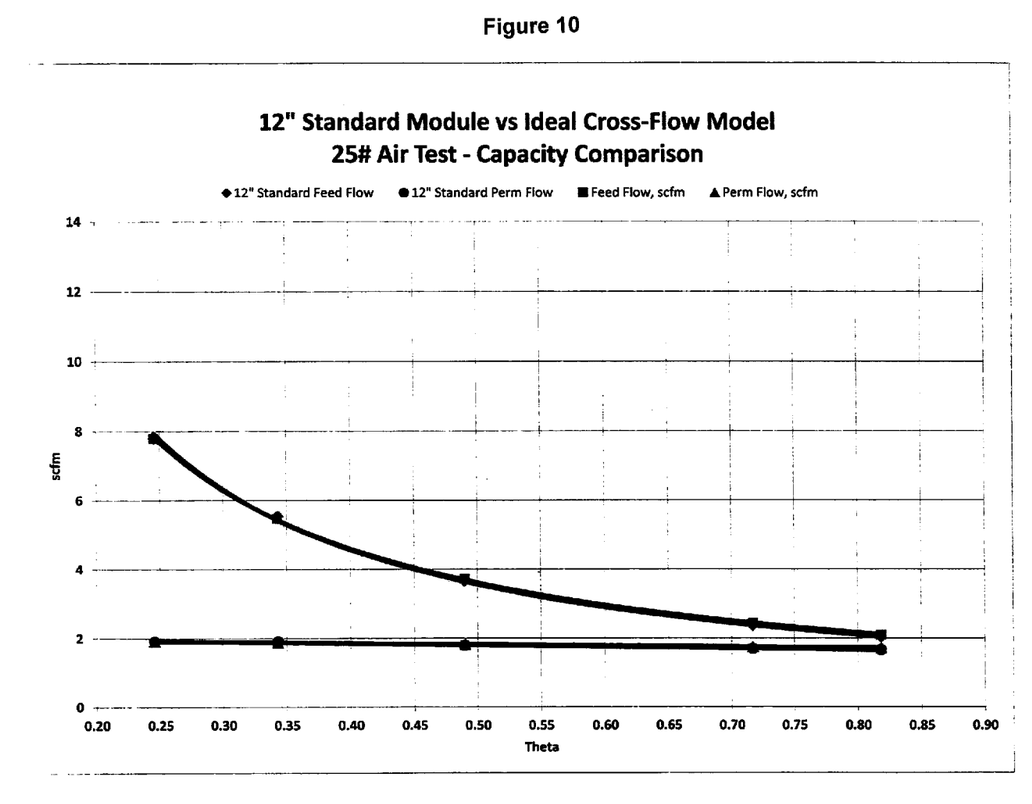
FIG. 10 is a chart comparing the standard module's capacity with ideal cross-flow.

FIGS. 9 and 10 show that the actual and predicted flow rates for both module types are essentially the same. The SE module air test performance tracks closely with the performance predicted by the computer model.

Although the air test is purely diffusion transport at very low flow rates, several conclusions can be reached about the performance of a separation device made according to this invention:

Module 10 outperforms an equivalent sized standard module in a 25 psig air test in both capacity and separation;

Unexpectedly and surprisingly, module 10 has 60% more capacity than an equivalent sized standard module and has effective $O_2$ and $N_2$ fluxes which are 35% and 45% higher than the standard module; and Separation performance of the module 10 nearly achieves ideal counter flow most likely because of the uniform spacing between the fibers 31 at the non-permeate flow end 43 (the sealed fiber end) of the fiber bundle 30.

While preferred embodiments of a single end, shell-side feed, hollow fiber, fluid separation device or module 10 have been described, the scope of the invention is defined by the following claims. Persons of ordinary skill in the art could make modifications to the specific elements listed in those claims without departing from the scope of the claims if the modifications are insubstantial, trivial ones or are equivalent in function, way, and result to the listed elements.

What is claimed:

1. A hollow fiber membrane separation device, the device arranged for counter-flow and comprising:
    a cylindrical-shaped pressure casing having a feed fluid inlet port, a non-permeate fluid outlet port, and a permeate fluid outlet port;
    a cylindrical-shaped cartridge arranged coaxially with the casing, the cartridge having a tubular-shaped inner core member and a plurality of hollow fiber membranes arranged in a bundle about the inner core member;
    the inner core member of the cartridge being in communication with the feed fluid inlet port of the casing, one end of the inner core member being perforated and terminating in a tubesheet;
    each hollow fiber membrane of the bundle having an open end toward a permeate fluid outlet end of the casing and a sealed fiber end toward a non-permeate fluid outlet end of the casing;
    a baffle arranged about the outer periphery of the bundle to force a feed fluid flow traveling between the open fiber end and the sealed fiber end to travel parallel to the hollow fiber membranes and in a direction counter to a fluid flow inside each hollow fiber membrane;
    the tubesheet encapsulating the open fiber end of the bundle, the other end of the hollow fiber bundle being the sealed fiber end.

2. The device according to claim 1 further comprising the hollow fiber membranes being uniformly spaced apart on the sealed fiber end of the bundle.

3. The device according to claim 1 wherein at least a portion of the sealed fiber ends are joined to form groups of fibers.

4. The device according to claim 1 wherein the sealed fiber end is a heat-sealed fiber end or a plugged fiber end.

5. The device according to claim 1 wherein the sealed fiber end is tubesheet-free.

6. The device according to claim 1 wherein the sealed fiber end does not obstruct feed fluid flow.

* * * * *